United States Patent
Renzi et al.

(10) Patent No.: US 9,527,948 B2
(45) Date of Patent: Dec. 27, 2016

(54) POLYMERIZABLE COMPOSITION, OPTICAL ARTICLE OBTAINED THEREFROM AND METHOD FOR THE PRODUCTION OF SAID OPTICAL ARTICLE

(71) Applicant: MITSUI CHEMICALS, INC., Minato-ku (JP)

(72) Inventors: Fiorenzo Renzi, Ravenna (IT); Roberto Forestieri, Ravenna (IT); Andrea Vecchione, Rimini (IT); Willem Bos, Arnhem (NL)

(73) Assignee: MITSUI CHEMICALS, INC., Tokyo (JP)

( * ) Notice: Subject to any disclaimer, the term of this patent is extended or adjusted under 35 U.S.C. 154(b) by 300 days.

(21) Appl. No.: 14/358,447

(22) PCT Filed: Nov. 16, 2012

(86) PCT No.: PCT/JP2012/007362
§ 371 (c)(1),
(2) Date: May 15, 2014

(87) PCT Pub. No.: WO2013/073194
PCT Pub. Date: May 23, 2013

(65) Prior Publication Data
US 2014/0327869 A1 Nov. 6, 2014

(30) Foreign Application Priority Data

Nov. 18, 2011 (IT) ................ MI2011A2102

(51) Int. Cl.
C08G 18/38 (2006.01)
G02B 1/04 (2006.01)
C08K 5/521 (2006.01)
G02B 1/11 (2015.01)
G02C 7/10 (2006.01)

(52) U.S. Cl.
CPC ....... C08G 18/3876 (2013.01); C08G 18/3863 (2013.01); C08G 18/3865 (2013.01); C08K 5/521 (2013.01); G02B 1/04 (2013.01); G02B 1/041 (2013.01); G02B 1/11 (2013.01); G02C 7/10 (2013.01); C08G 2125/00 (2013.01)

(58) Field of Classification Search
CPC .................................. C08G 18/2027
USPC ......................................... 528/76
See application file for complete search history.

(56) References Cited

U.S. PATENT DOCUMENTS

| 5,087,758 A | 2/1992 | Kanemura et al. |
| 5,693,738 A | 12/1997 | Okazaki et al. |
| 2004/0026658 A1* | 2/2004 | Yoshimura ......... C08G 18/3876 252/183.11 |
| 2004/0122201 A1* | 6/2004 | Yoshimura ........... C08G 18/246 528/44 |
| 2008/0097045 A1* | 4/2008 | Isahaya .................. C08G 18/12 525/457 |
| 2013/0066034 A1* | 3/2013 | Renzi .................... C08G 18/089 528/51 |

FOREIGN PATENT DOCUMENTS

| CN | 1112136 A | 11/1995 |
| CN | 102143984 A | 8/2011 |
| EP | 0676428 A1 | 10/1995 |
| EP | 1746118 A1 | 1/2007 |
| EP | 2075271 A1 | 7/2009 |
| EP | 2341091 A1 | 7/2011 |
| GB | 2200126 A | 7/1988 |
| JP | 60-199016 A | 10/1985 |
| JP | 63-046213 A | 2/1988 |
| JP | 07-324118 A | 12/1995 |

(Continued)

OTHER PUBLICATIONS

Machine translation of JP 2006265408 A.*
Office Action issued by the Korean Patent Office in corresponding Korean Patent Application No. 10-2014-7012387 on Sep. 15, 2015 (5 pages).
Office Action issued on Mar. 10, 2015, by the Japanese Patent Office in corresponding Japanese Patent Application No. 2014-523863.(4 pages).

(Continued)

Primary Examiner — Mike M Dollinger
(74) Attorney, Agent, or Firm — Buchanan, Ingersoll & Rooney PC

(57) ABSTRACT

The present invention relates to a polymerizable composition comprising polyisocyanate(s) (A), polythiol(s) (B), thiol(s) (C) and catalyst(s) (D). The polyisocyanate(s) (A) is at least one bifunctional or higher functional alicyclic polyisocyanate; the polythiol(s) (B) is at least one compound selected from polythiols represented by the following general formula (B1); the thiol(s) (C) is at least one compound selected from thiols having general formula (3); and the catalyst(s) (D) is at least one polymerization catalyst selected from metal compounds, quaternary ammonium salts, organic sulfonic acids, tertiary amines and relative inorganic or organic salts.

$$HS {\underset{O}{\underbrace{{\Large(}\phantom{x}{\Large)}}_{l}}} {\Large(} O {\underset{\underset{R}{|}}{\phantom{x}}} {\Large)}_{r} {\Large(} \underset{\underset{O}{\|}}{\phantom{x}} O {\Large)}_{n} {\Large(} \phantom{x} {\Large)}_{m} SH \qquad (B1)$$

$$\begin{array}{c} R1 \\ | \\ R2-C-H \\ | \\ R3 \end{array} \qquad (3)$$

10 Claims, No Drawings

(56) References Cited

FOREIGN PATENT DOCUMENTS

| JP | 08-003267 A | | 1/1996 |
|---|---|---|---|
| JP | 08-208792 A | | 8/1996 |
| JP | 08-208794 A | | 8/1996 |
| JP | 09-005679 A | | 1/1997 |
| JP | 09-110955 A | | 4/1997 |
| JP | 09-208651 A | | 8/1997 |
| JP | 2006265408 A | * | 10/2006 |
| JP | 2008-056854 A | | 3/2008 |
| JP | 2011-231305 A | | 11/2011 |
| JP | 2013-528681 | | 7/2013 |
| KR | 10-0191067 B1 | | 6/1999 |
| WO | WO 2011/144995 A1 | | 11/2011 |

OTHER PUBLICATIONS

Office Action issued in corresponding Chinese Application No. 2012800556810 on Mar. 24, 2015 (8 pages).

International Search Report (PCT/ISA/210) mailed on Feb. 19, 2013, by the Japanese Patent Office as the International Searching Authority for International Application No. PCT/JP2012/007362.

Extended Search Report issued by the European Patent Office in corresponding European Patent Application No. 12849147 on Jun. 1, 2015 (7 pages).

* cited by examiner

POLYMERIZABLE COMPOSITION, OPTICAL ARTICLE OBTAINED THEREFROM AND METHOD FOR THE PRODUCTION OF SAID OPTICAL ARTICLE

TECHNICAL FIELD

The present invention relates to a polymerizable composition for preparing a thiourethane resin, an optical material obtained therefrom, and a method for manufacturing said optical article.

BACKGROUND ART

Plastic lenses (organic polymers) are light-weight, difficult to crack, and can be tinted, as compared with inorganic lenses. Accordingly, devices containing lenses in polymeric material, such as eye-glasses and cameras, have been rapidly spreading on a commercial scale.

Various polymeric materials to be used for the production of lenses have been developed in the state of the art. A typical example of these materials can be thiourethane resins obtained from polymerizable compositions including a polyisocyanate compound and a thiol (see Patent Literatures 1 to 5).

CITATION LIST

Patent Literature

[PTL 1] Japanese Laid-Open Patent Publication No. 60-199016
[PTL 2] Japanese Laid-Open Patent Publication No. 63-046213
[PTL 3] Japanese Laid-Open Patent Publication No. 07-324118
[PTL 4] Japanese Laid-Open Patent Publication No. 08-003267
[PTL 5] Japanese Laid-Open Patent Publication No. 09-110955

SUMMARY OF INVENTION

Technical Problem

One of the problems of thiourethane resins known in the art is due to the fact that the hardness of these materials tends to diminish with an increase in the impact strength. This characteristic has so far prevented the use of materials contemporaneously having an excellent impact strength and adequate hardness. Furthermore, there has recently been a high demand for optical articles, in particular variously coloured lenses for eye-glasses. For this reason, in the state of the art, the necessity is strongly felt for availing of materials which, in addition to having the above-mentioned characteristics of impact strength and hardness, can also be easily tinted.

An objective of the invention is to provide a polymerizable composition for preparing a resin having a high refractive index, which combines an excellent impact strength with an optimum hardness and tintability.

Solution to Problem

It has now been found that the problems of the optical materials known in the art mentioned above, can be overcome, at least partially, by the optical materials that can be obtained with the polymerizable composition of the present invention.

(1) A polymerizable composition comprising polyisocyanate(s) (A), polythiol(s) (B), thiol(s) (C) and catalyst(s) (D),
wherein the polyisocyanate(s) (A) is at least one bifunctional or higher functional alicyclic polyisocyanate compound,
the polythiol(s) (B) is at least one compound selected from polythiols represented by the following general formula (B1):

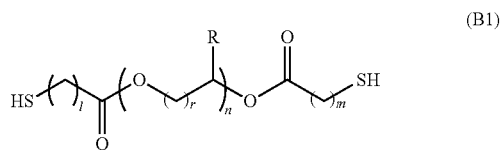

(B1)

wherein l and m, the same or different from each other, represent an integer from 1 to 4; n represents an integer from 1 to 3; r represents an integer from 1 to 4; and R represents hydrogen or a methyl group and, when n is different from 1, the R groups are the same as or different from each other,
the thiol(s) (C) is at least one compound selected from thiols represented by the following general formula (3):

(3)

wherein R1, R2, R3, the same or different from each other, are selected from —(CH$_2$)$_n$—SH, —S—(CH$_2$)$_n$—SH and —R—S—(CH$_2$)$_n$—SH, wherein R is an alkylene group having from 1 to 10 carbon atoms, n is an integer ranging from 1 to 3, said compound represented by the general formula (3) containing at least two SH groups and at least a —S— bridge and
the catalyst(s) (D) is at least one polymerization catalyst selected from metal compounds, quaternary ammonium salts, organic sulfonic acids, tertiary amines and their inorganic or organic salts.

(2) The polymerizable composition according to (1), further comprising at least one compound selected from the thiols having general formula (B2)

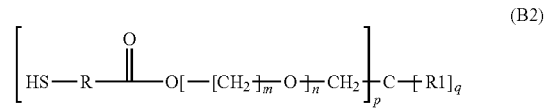

(B2)

wherein R represents alkylene groups, the same or different from each other, having from 1 to 6 carbon atoms; R1 represents alkyl groups, the same or different from each other, having from 1 to 10 carbon atoms; n is an integer ranging from 1 to 6; m is an integer ranging from 1 to 6; p is an integer ranging from 1 to 4; q is equal to 0 or 1 and p+q is equal to 4.

(3) The polymerizable composition according to (1) or (2), wherein the polyisocyanate(s) (A) is selected from 1,3-bis(isocyanatemethyl)cyclohexane, 1,4-bis(iso-cyanatemethyl)cyclohexane, bis(4-isocyanatecyclo-hexyl) methane, and bis(isocyanatemethyl)-bicyclo-[2.2.1]heptane.

(4) The polymerizable composition according to any of (1) to (3), wherein the polyisocyanate(s) (A) is a combination of at least two compounds selected from bis(4-isocyanatecyclohexyl)methane, bis(isocyanate-methyl)-bicyclo[2.2.1]heptane, 1,3-bis(isocyanatemethyl)-cyclohexane, and 1,4-bis(isocyanatemethyl)cyclohexane.

(5) The polymerizable composition according to any of (1) to (4), wherein in polythiols (B1), 1 and m, the same or different, represent an integer ranging from 1 to 2 and n is 1.

(6) The polymerizable composition according to any of (1) to (5), further comprising a polyisocyanate (E) selected from a non-cyclic aliphatic polyisocyanate, an aromatic polyisocyanate, an aliphatic polyisocyanate containing sulfur atoms, an aromatic polyisocyanate containing sulfur atoms, preferably a non-cyclic aliphatic polyisocyanate.

(7) The polymerizable composition according to (6), wherein the polyisocyanate (E) is selected from m-xylene diisocyanate, 2,4-tolylene diisocyanate, 2,6-tolylene diisocyanate, 4,4'-diphenylmethane diisocyanate, pentamethylene diisocyanate, hexamethylene diisocyanate, heptamethylene diisocyanate, octamethylene diisocyanate or mixtures thereof, more preferably from pentamethylene diisocyanate, hexamethylene diisocyanate, heptamethylene diisocyanate, or octamethylene diisocyanate.

(8) The polymerizable composition according to any of (1) to (7), wherein the thiol(s) (C) is selected from 4-mercaptomethyl-1,8-dimercapto-3,6-dithiaoctane, 4,8-, 4,7-, or 5,7-dimercaptomethyl-1,1'-dimercapto-3,6,9-tri-thiaundecane, and 2,5-bis(mercaptomethyl)-1,4-dithiane.

(9) The polymerizable composition according to any of (2) to (8), wherein the molar ratio between the mercapto groups belonging to the polythiols (B1), the thiol(s) (C) and possibly the thiols (B2) with respect to the isocyanate groups of the polyisocyanate(s) (A) varies within the range of 0.8-1.2, preferably within the range of 0.85-1.15, even more preferably within the range of 0.9-1.1.

(10) The polymerizable composition according to any of (1) to (9), wherein the catalyst comprises a tertiary amine having general formula (4)

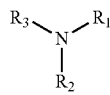

(4)

wherein $R_1$, $R_2$, $R_3$, the same or different, are selected from a linear or branched aliphatic group containing from 1 to 20 carbon atoms, or an alicyclic group containing from 3 to 20 carbon atoms, said groups possibly containing heteroatoms such as N, O, P, S or halogen.

(11) The polymerizable composition according to any of (1) to (10), further comprising an internal releasing agent consisting of a diester monoacid phosphate represented by the following general formula (5):

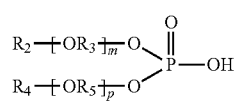

(5)

wherein $R_2$ and $R_4$, the same or different, represent a linear or branched aliphatic group containing from 1 to 20 carbon atoms, or a cyclo-aliphatic group containing from 3 to 20 carbon atoms; $R_3$ and $R_5$, the same or different, represent an alkylene group containing from 1 to 3 carbon atoms and m and p, independently from each other, are 0, 1 or 2.

(12) An optical article obtained through the polymerization of the polymerizable composition according to any of (1) to (11).

(13) An optical lens, in particular for eye-glasses, comprising the optical article according to (12), and further comprising a hard coat layer and an anti-reflective layer.

(14) A method for manufacturing an optical article comprising the following phases:

injecting a polymerizable composition according to any of (1) to (11) into a mould and let it polymerize, forming an optical article;

depositing sequentially a hard coating layer and an anti-reflection layer in sequence on said optical article.

Advantageous Effects of Invention

The optical material (thiourethane resin) comprised of the polymerizable composition of the present invention, in fact, has a high refractive index, an excellent compromise between impact strength and hardness, in addition to an excellent tintability.

The above optical material, in addition, is characterized in that it has a favourable compromise between a high refractive index and transparency.

DESCRIPTION OF EMBODIMENTS

The polymerizable composition of the present invention is comprised of following polyisocyanate(s) (A), polythiol(s) (B), thiol(s) (C) and catalyst(s) (D).

The polyisocyanate(s) (A) is at least one bifunctional or higher functional alicyclic polyisocyanate compound.

The polythiol(s) (B) is at least one compound selected from polythiols represented by the following general formula (B1):

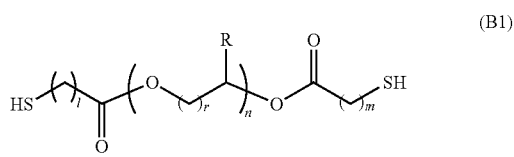

(B1)

In the general formula (B1), l and m, the same or different from each other, represent an integer from 1 to 4; n represents an integer from 1 to 3; r represents an integer from 1 to 4; and R represents hydrogen or a methyl group and, when n is different from 1, the R groups are the same as or different from each other.

The thiol(s) (C) is at least one compound selected from thiols represented by the following general formula (3):

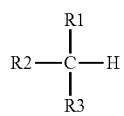

(3)

In the general formula (3), R1, R2, R3, the same or different from each other, are selected from —(CH$_2$)$_n$—SH, —S—(CH$_2$)$_n$—SH and —R—S—(CH$_2$)$_n$—SH, wherein R is an alkylene group having from 1 to 10 carbon atoms, n is an integer ranging from 1 to 3, said compound represented by the general formula (3) containing at least two SH groups and at least a —S— bridge.

The catalyst(s) (D) is at least one polymerization catalyst selected from metal compounds, quaternary ammonium salts, organic sulfonic acids, tertiary amines and their inorganic or organic salts.

Since the polymerizable composition of the present invention is comprised of the polyisocyanate(s) (A), the polythiol(s) (B), the thiol(s) (C) and the catalyst(s) (D) as described above, an optical material (thiourethane resin) comprised of this composition has a high refractive index, an excellent compromise between impact strength and hardness, in addition to an excellent tintability, as unexpected effects. In particular, it has been surprisingly observed, in fact, that the above-mentioned combination of the polyisocyanate(s) (A), the polythiol(s) (B) and the thiol(s) (C) allows an optical material with an enhanced impact strength to be obtained.

Polyisocyanate(s) (A)

The polyisocyanate(s) (A) is a compound with a cyclic skeleton, not containing any aromatic ring and with two or more isocyanate groups.

The polyisocyanate(s) (A) is preferably selected from 1,3-bis(isocyanatemethyl)cyclohexane, 1,4-bis(isocyanatemethyl)cyclohexane, bis(4-isocyanatecyclohexyl)methane and bis(isocyanatemethyl)-bicyclo[2.2.1]heptane or mixtures thereof.

The bis(isocyanatemethyl)-bicyclo[2.2.1]heptane can be either the isomer 2,5-bis(isocyanatemethyl)-bicyclo[2.2.1]heptane or 2,6-bis(isocyanatemethyl)-bicyclo[2.2.1]heptane or mixtures thereof.

Other polyisocyanate(s) (A) is:

1,2-bis(isocyanatemethyl)cyclohexane, cyclohexane diiso-cyanate, methylcyclohexane diisocyanate, 2,2-bis(4-isocyanatecyclohexyl)propane, 3,8-bis(isocyanatemethyl) tricyclodecane, 3,9-bis(isocyanatemethyl)tricyclodecane, 4,8-bis(isocyanatemethyl)tricyclodecane and 4,9-bis(iso-cyanatemethyl)tricyclodecane, or mixtures thereof.

In a preferred embodiment of the polymerizable composition of the present invention, the polyisocyanate(s) (A) is a combination of at least two compounds selected from bis(4-isocyanatecyclohexyl)methane, and bis(isocyanatemethyl)-bicyclo[2.2.1]heptane, 1,3-bis(isocyanatemethyl)cyclohexane and 1,4-bis(isocyanate-methyl)cyclohexane.

The weight percentage of free isocyanate groups in said polyisocyanate(s) (A) ranges from 20% to 50% by weight with respect to the total weight of polyisocyanate(s) (A) and, preferably, ranges from 25% to 45% by weight with respect to the total weight of polyisocyanate(s) (A).

It has been surprisingly observed, in fact, that the above-mentioned combination of polyisocyanates allows an optical material with an enhanced impact strength to be obtained.

The polymerizable composition according to the present invention can contain a further polyisocyanate compound (E), as optional component, in addition to polyisocyanate(s) (A) described above.

The polyisocyanate (E) can be an aliphatic or aromatic compound, containing at least two isocyanate groups in the molecule. In addition the polyisocyanate (E) can also contain at least one sulfur atom and the like. The polyisocyanate (E) can be a dimer, trimer or a pre-polymer.

More specifically, the polyisocyanate (E) can be a non-cyclic aliphatic polyisocyanate, an aromatic polyisocyanate, an aliphatic polyisocyanate containing sulfur atoms, an aromatic polyisocyanate containing sulfur atoms. The polyisocyanate (E) is preferably a non-cyclic aliphatic polyisocyanate.

Examples of non-cyclic aliphatic polyisocyanates comprise: pentamethylene diisocyanate, hexamethylene diisocyanate, heptamethylene diisocyanate, octamethylene diisocyanate, 2,2-dimethylpentane diisocyanate, 2,2,4-trimethylhexane diisocyanate, 2,4,4-trimethylhexamethylene diisocyanate, 1,6,11-undecatriisocyanate, 1,3,6-hexamethylene triisocyanate, 1,8-diisocyanate-4-isocyanatemethyloctane, bis(isocyanate-ethyl)carbonate, bis(isocyanate-ethyl)ether, o-xylene diisocyanate, m-xylene diisocyanate, p-xylene diisocyanate, bis (isocyanate-ethyl)benzene, bis(isocyanate propyl)benzene, bis(iso-cyanatemethyl)naphthalene.

Examples of aromatic polyisocyanates comprise: naphthalene diisocyanate, m-phenylene diisocyanate, p-phenylene diisocyanate, 2,4-tolylene diisocyanate, 2,6-tolylene diisocyanate, biphenyldiisocyanate, 4,4'-diphenylmethane diisocyanate, benzenetriisocyanate. Examples of aliphatic polyisocyanates containing sulfur comprise: bis(isocyanatemethyl)sulfide, bis(isocyanate-ethyl)sulfide, bis(isocyanatepropyl)sulfide, bis(isocyanatemethyl)sulfone, bis(isocyanatemethyl)disulfide, bis(isocyanatepropyl)disulfide, bis (isocyanatemethylthio)methane, bis(isocyanate-ethylthio) ethane, bis(isocyanate-ethylthio)methane, bis(isocyanate-ethylthio)ethane, 1,5-diisocyanate-2-isocyanatomethyl-3-thiapentane, bis(3-isocyanatemethylphenyl)sulfide, bis(4-isocyanatemethylphenyl)sulfide, bis(3-isocyanatemethylbenzyl)sulfide, bis(4-isocyanatemethylbenzyl)sulfide, bis(3-isocyanatemethylphenyl)disulfide and bis(4-isocyanatemethylphenyl)disulfide.

Examples of aromatic polyisocyanates containing sulfur comprise: bis(3-isocyanatephenyl)sulfide, bis(4-isocyanatephenyl) sulfide, bis(3-isocyanatephenyl)disulfide, bis(4-isocyanatephenyl)disulfide.

More specifically, the polyisocyanate (E) is preferably selected from m-xylene diisocyanate, 2,4-tolylene diisocyanate, 2,6-tolylene diisocyanate, 4,4'-diphenylmethane diisocyanate, pentamethylene diisocyanate, hexamethylene diisocyanate, heptamethylene diisocyanate, or octamethylene diisocyanate, or mixtures thereof.

Even more preferably, the polyisocyanate (E) is selected from pentamethylene diisocyanate, hexamethylene diisocyanate, heptamethylene diisocyanate, or octamethylene diisocyanate.

Polythiol(s) (B)

The polymerizable composition according to the present invention also comprises polythiol(s) (B) which is at least one compound selected from polythiols represented by the following general formula (B1).

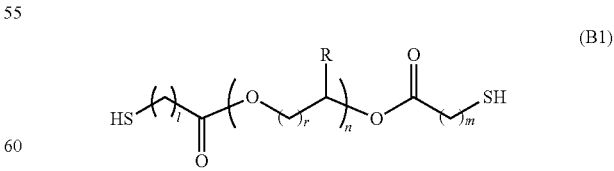

(B1)

In the formula (B1), l represents an integer from 1 to 4, preferably 1 or 2; m represents an integer from 1 to 4, preferably 1 or 2; n represents an integer from 1 to 3, preferably 1 or 2, more preferably 1; r represents an integer from 1 to 4, preferably 1 or 2, more preferably 1; R represents hydrogen or a methyl group, and when n is different from 1, the R groups are the same or different from each other.

Preferably in the polythiols (B1), l and m independently represent an integer equal to 1 or 2, n is 1 and r is 1.

When the polymerizable composition of the present invention includes the compound represented by the general formula (B1), a resin or optical material having an excellent balance between impact strength and hardness, and an excellent tintability, can be obtained.

The polythiols (B1) are a condensate of ethylene glycol, diethylene glycol, triethylene glycol, or propylene glycol with a mercaptoalkylcarboxylic acid.

Specific examples of polythiols (B1) include:
ethylene glycol bis(mercaptoacetate), ethylene glycol bis(mercaptopropionate),
ethylene glycol bis(mercaptobutyrate),
diethylene glycol bis(mercaptoacetate),
diethylene glycol bis(mercaptopropionate),
diethylene glycol bis(mercaptobutyrate),
triethylene glycol bis(mercaptoacetate),
triethylene glycol bis(mercaptopropionate),
triethylene glycol bis(mercaptobutyrate). These compounds can be present in the polymerizable composition alone or in a combination of two or more thereof.

The polythiols (B1) are preferably selected from:
ethylene glycol bis(mercaptoacetate), ethylene glycol bis(mercaptopropionate), diethylene glycol bis(mercaptoacetate), or diethylene glycol bis(mercaptopropionate).

In another preferred embodiment of the present invention, in addition to the polythiols (B1), the present polymerizable composition object of the present invention, also comprises at least one thiol represented by the following general formula (B2).

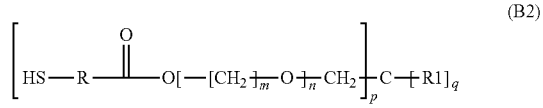

In the formula (B2), R represents alkylene groups, the same or different, having from 1 to 6 carbon atoms; R1 represents alkyl groups, the same or different, having from 1 to 10 carbon atoms; n is an integer ranging from 1 to 6; m is an integer ranging from 1 to 6; p is an integer ranging from 1 to 4; q is equal to 0 or 1 and p+q is equal to 4.

Thiols (B2) are compounds having an active hydrogen atom (the hydrogen of the group —SH) and an ester bond.

The thiols (B2) can be aliphatic or aromatic.

Examples of aliphatic thiols include:
methanedithiol, 1,2-ethanedithiol, 1,2-propanedithiol, 1,3-propanedithiol, 1,4-butanedithiol, 1,5-pentanedithiol, 1,6-hexanedithiol, 1,2-cyclohexanedithiol, 3,4-dimethoxybutane-1,2-dithiol, 2-methylcyclohexane-2,3-dithiol, 1,2-dimercaptopropylmethyl ether, 2,3-dimercaptopropylmethyl ether, bis(2-mercaptoethyl)ether, tetrakis(mercaptomethyl)methane.

Examples of aliphatic thiols containing at least one ester bond include:
2,3-dimercapto-1-propanol(3-mercaptopropionate), 3-mercapto-1,2-propanediol bis(2-mercaptoacetate), 3-mercapto-1,2-propanediol di(3-mercaptopropionate), trimethylolpropane tris(2-mercaptoacetate), trimethylolpropane(3-mercaptopropionate), trimethylolethane tris(2-mercaptoacetate), trimethylolethane tris(3-mercaptopropionate), pentaerythritol tetrakis(2-mercaptoacetate), pentaerythritol(3-mercaptopropionate), pentaerythritol bis(3-mercaptopropionate), pentaerythritol tris(3-mercaptopropionate), glycerin tris(2-mercaptoacetate), glycerin tris(3-mercaptopropionate), 1,4-cyclohexanediol bis(2-mercaptoacetate), 1,4-cyclohexanediol bis(3-mercaptopropionate), hydroxymethylsulfide bis(2-mercaptoacetate), hydroxymethylsulfide bis(3-mercaptopropionate), hydroxyethylsulfide(2-mercaptoacetate), hydroxyethylsulfide(3-mercaptopropionate), hydroxymethyldisulfide(2-mercaptoacetate), hydroxymethyldisulfide(3-mercaptopropionate), thiodiglycolic acid bis(2-mercaptoethyl), thiodipropionic acid bis(2-mercaptoethyl).

Examples of thiols (B2) of the aromatic type include:
1,2-dimercaptobenzene, 1,3-dimercaptobenzene, 1,4-dimercaptobenzene, 1,2-bis(mercaptomethyl)benzene, 1,4-bis(mercaptomethyl)benzene, 1,2-bis(mercaptoethyl)benzene, 1,4-bis(mercaptoethyl)benzene, 1,2,3-trimercaptobenzene, 1,2,4-trimercaptobenzene, 1,3,5-trimercaptobenzene, 1,2,3-tris(mercaptomethyl)benzene, 1,2,4-tris(mercaptomethyl)benzene, 1,3,5-tris(mercaptomethyl)benzene, 1,2,3-tris(mercaptoethyl)benzene, 1,3,5-tris(mercaptoethyl)benzene, 1,2,4-tris(mercaptoethyl)benzene, 2,5-toluenedithiol, 3,4-toluenedithiol, 1,4-naphthalenedithiol, 1,5-naphthalenedithiol, 2,6-naphthalenedithiol, 2,7-naphthalenedithiol, 1,2,3,4-tetramercaptobenzene, 1,2,3,5-tetramercaptobenzene, 1,2,4,5-tetramercaptobenzene, 1,2,3,4-tetrakis(mercaptomethyl)benzene, 1,2,3,5-tetrakis(mercaptomethyl)benzene, 1,2,4,5-tetrakis(mercaptomethyl)benzene, 1,2,3,4-tetrakis(mercaptoethyl)benzene, 1,2,3,5-tetrakis(mercaptoethyl)benzene, 1,2,4,5-tetrakis(mercaptoethyl)benzene, 2,2'-dimercaptobiphenyl, 4,4'-dimercaptobiphenyl, Among the above compounds, preferred thiols (B2) are the following: pentaerythritol tetrakis(2-mercaptoacetate), pentaerythritol(3-mercaptopropionate), trimethylolpropane tris(2-mercaptoacetate), trimethylolpropane(3-mercaptopropionate).

Thiol(s) (C)

The polymerizable composition according to the present invention also comprises thiol(s) (C) which is at least one selected from compounds represented by general formula (3)

In the formula (3), R1, R2, R3, the same or different, are selected from —(CH$_2$)$_n$—SH, —S—(CH$_2$)$_n$—SH and —R—S—(CH$_2$)$_n$—SH, wherein R is an alkylene group having from 1 to 10 carbon atoms, n is an integer ranging from 1 to 3, said compound represented by the general formula (3) containing at least two SH groups and at least one bridge —S—.

The thiol(s) (C) can also comprise functionalities consisting of OH groups. The thiol(s) (C) preferably contains three or more SH groups.

The molar ratio of the mercapto group belonging to the polythiols (B1), the thiol(s) (C) and possibly the thiols (B2) with respect to the isocyanate group in the polyisocyanate(s) (A) is preferably within the range of 0.8 to 1.2, preferably within the range of 0.85 to 1.15, and even more preferably within the range of 0.9 to 1.1. In these ranges, a thiourethane resin is obtained, which is suitable for use as optical material, in particular, a material for producing lenses for eyeglasses.

Furthermore, from the view of the effects of the present invention, the weight ratio of the polythiols (B1) to the thiol(s) (C) is preferably from 5:95 to 90:10.

Examples of the thiol(s) (C) include
aliphatic compounds (a) having one or more sulfide bonds, and at least two SH groups, said aliphatic compounds at the same time having a total number of SH groups and OH groups equal to 2 or more;
alicyclic compounds (b) having at least two sulfide bonds, and at least two SH groups, said compounds at the same time having a total number of SH groups and OH groups equal to 2 or more.

Examples of aliphatic compounds (a) comprise:
4-mercaptomethyl-1,8-dimercapto-3,6-dithiaoctane, 4,8-, 4,7-, or 5,7-dimercaptomethyl-1,1-dimercapto-3,6,9-tri-thiaundecane, tetrakis(mercaptomethyl)methane, bis-(mercaptomethyl)sulfide, bis(mercaptomethyl)disulfide, bis-mercaptoethyl)sulfide, bis(mercaptoethyl)disulfide, bis-(mercaptomethylthio)methane, bis(2-mercaptoethylthio)methane, 1,2-bis(mercaptomethylthio)ethane, 1,2-bis(2-mercaptoethylthio)ethane, 1,3-bis(mercaptomethylthio)propane, 1,3-bis(2-mercaptoethylthio)propane, 1,2,3-tris(mercaptomethylthio)propane, 1,2,3-tris(2-mercaptoethylthio)propane, 1,2,3-tris(3-mercaptopropylthio)propane, 1,1,3,3-tetrakis(mercaptomethylthio)propane, tetrakis(mercaptomethylthiomethyl)methane, tetrakis(2-mercaptoethylthiomethyl)methane and bis(2,3-dimercaptopropyl)sulfide or mixtures thereof.

Examples of alicyclic compounds (b) comprise 2,5-bis(mercaptomethyl)-1,4-dithiane, 4,6-bis(mercaptomethylthio)-1,3-dithiane, 2-(2,2-bis(mercaptomethylthio)ethyl)-1,3-dithiethane.

The polymerizable composition of the present invention preferably comprises thiol(s) (C) which is at least one compound selected from 4-mercaptomethyl-1,8-dimercapto-3,6-dithiaoctane, 4,8-, 4,7-, or 5,7-dimercaptomethyl-1,1'-dimercapto-3,6,9-trithiaundecane, and 2,5-bis(mercaptomethyl)-1,4-dithiane.

Catalyst(s) (D)

The polymerizable composition of the present invention also comprises catalyst(s) (D) which is at least one polymerization catalyst selected from metal compounds, preferably organometallic, quaternary ammonium salts, organic sulfonic acids, tertiary amines and relative inorganic or organic salts.

(i) Examples of tertiary amines are the following compounds represented by general formula (4)

(4)

In the general formula (4), $R_1$, $R_2$, $R_3$, the same or different, are selected from a linear or branched aliphatic group containing from 1 to 20 carbon atoms, or an alicyclic group containing from 3 to 20 carbon atoms. These groups can contain heteroatoms such as N, O, P, S or halogen.

(ii) Further examples of tertiary amines are: N-methylpiperidine, N-methylpyrrolidine, N,N,N',N'-tetramethylethylenediamine, N-methylhexamethyleneimine, 1,8-diazabicyclo[5,4,0]-7-undecene, 4-dimethylaminopyridine, 4,4'-dipyridyl.

(iii) Examples of aliphatic tertiary amines are: triethylamine, tri-n-propylamine, triisopropylamine, tri-n-butylamine, triisobutylamine, benzyldimethylamine, n-methylmorpholine, dimethylcyclohexylamine, 1,2,2,6,6-pentamethyl-4-piperidinol, 1,2,2,6,6-pentamethyl-4-hydroxyethyl-4-piperidinol, dimethyldipropylenetriamine, pentamethyldiethylenetriamine, bis(2-dimethylaminoethyl) ether, N-methylmorpholine, triethylenediamine, and bicyclooctanediamine (DABCO).

In particular, examples of liquid tertiary amines are:
methyl-1,2,2,6,6-pentamethyl-4-piperidinyl sebacate, bis(1,2,2,6,6-pentamethyl-4-piperidinyl) sebacate, and bis(2,2,6,6-tetramethyl-1-(octyloxy)-4-piperidinyl) sebacate.

Further, the present invention may take an embodiment in which a compound other than the compound (I) or (iii) above is used as a polymerization catalyst.

In the above-mentioned embodiment, the compound (iii) above which is not used includes "triethylamine, tri-n-propylamine, triisopropylamine, methyl-1,2,2,6,6-pentamethyl-4-piperidinyl sebacate, and bis(1,2,2,6,6-pentamethyl-4-piperidinyl) sebacate", or "triethylamine, methyl-1,2,2,6,6-pentamethyl-4-piperidinyl sebacate, and bis(1,2,2,6,6-pentamethyl-4-piperidinyl) sebacate".

In the "embodiment in which a compound other than the compound (I) or (iii) above is used as a polymerization catalyst", a metal compound, a quaternary ammonium salt, or an organic sulfonic acid can be used as the polymerization catalyst.

Examples of inorganic acids to be combined with a tertiary amine to form a salt comprise hydrochloric acid, sulfuric acid, nitric acid and phosphoric acid.

Examples of organic acids to be combined with a tertiary amine to form a salt comprise formic acid, acetic acid, oxalic acid, acrylic acid, methacrylic acid, p-toluenesulfonic acid, methanesulfonic acid, diacid monoester phosphates, diacid diester phosphates.

Examples of metal and organometallic compounds which can be used as catalysts include compounds of tin, zinc and iron, in particular dimethyl tin dichloride, dibutyl tin dichloride, dibutyl tin dilaurate, tin chloride, zinc dibutyldithiocarbamate, zinc dimethyldithiocarbamate, zinc chloride, zinc organophosphates, tin organophosphates, iron organophosphates, iron thiolates, zinc thiolates.

Examples of quaternary ammonium salts include: tetramethylammonium chloride, tetramethylammonium bromide, tetramethylammonium methanesulfonate, tetramethylammonium p-toluenesulfonate, tetramethylammonium benzenesulfonate, tetrabutylammonium chloride, tetrabutylammonium bromide, tetrabutylammonium methanesulfonate, tetrabutylammonium p-toluenesulfonate, tetrabutylammonium benzenesulfonate, trioctylmethylammonium chloride, trioctylmethylammonium bromide, trioctylmethylammonium methanesulfonate, trioctylmethylammonium p-toluenesulfonate, trioctylmethylammonium benzenesulfonate.

Examples of organic sulfonic acids comprise methanesulfonic acid, benzenesulfonic acid, p-toluenesulfonic acid.

The above catalysts can be used in the polymerizable composition according to the present invention, either individually or combined with two or more compounds.

The polymerizable composition of the present invention can also contain at least one internal release agent to facilitate the detachment of the optical article from the mould, after the polymerization reaction.

Compounds known in the art can be used as internal release agents. Acid phosphates are preferred internal release agents. Examples of acid phosphates comprise monoester and diester acid phosphates. Particularly preferred are diester monoacid phosphates represented by the following general formula (5):

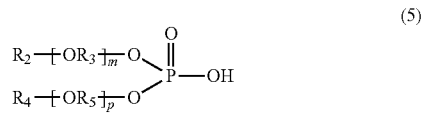

(5)

In the general formula (5), $R_2$ and $R_4$, the same or different, represent a linear or branched aliphatic group containing from 1 to 20 carbon atoms, or a cyclo-aliphatic group containing from 3 to 20 carbon atoms; $R_3$ and $R_5$, the same or different, represent an alkylene group containing from 1 to 3 carbon atoms and m and p, independently, are 0, 1 or 2.

The acid phosphates having formula (5) are preferably selected from bis(2-ethylhexyl)phosphate, diester of phosphoric acid, containing from 1 to 8 carbon atoms, diester of phosphoric acid, containing from 1 to 10 carbon atoms or mixtures thereof.

The release agents can be added to the polymerizable composition alone or in a combination of two or more.

The polymerizable composition of the present invention can also contain a resin modifier, in an amount which is such as to not negatively influence the efficacy of the polymerizable composition, in order to control the optical properties of the resin, the physical properties (for example, the impact strength), the density and, in addition, to regulate the viscosity and useful processing time of the composition (so-called pot life).

Examples of resin modifiers comprise episulfide compounds, alcohols, amines, epoxy resins, organic acids and relative anhydrides, olefins and (meth)acrylates.

The polymerizable compositions can also contain additives typically used in the field of the production of polymeric articles, such as, for example, photo-stabilizing compounds, UV-absorbers, antioxidants and bluing agents, dyes soluble in the polymerizable composition or adhesion promoting agents.

The polymerizable composition of the present invention is prepared by the homogenous mixing of the different components.

The mixing of the ingredients of the polymerizable composition is usually carried out at a temperature of 25 degrees C. or lower, when, in addition to the monomer to be used, a catalyst, an internal detaching agent, and other additives, are present.

The quantity of polyisocyanate(s) (A) is from 20 to 80 parts by weight with respect to the total weight of the polymerizable composition and preferably from 30 to 70 parts by weight with respect to the total weight of the polyisocyanate(s) (A) to catalyst(s) (D).

The quantity of polythiol(s) (B) is from 1 to 70 parts by weight with respect to the total weight of the polymerizable composition and preferably from 3 to 60 parts by weight with respect to the total weight of the polyisocyanate(s) (A) to catalyst(s) (D).

The quantity of thiol(s) (C) is from 5 to 70 parts by weight with respect to the total weight of the polymerizable composition and preferably from 20 to 60 by weight with respect to the total weight of the polyisocyanate(s) (A) to catalyst(s) (D).

The quantity of catalyst(s) (D) is from 0.001 to 5 parts by weight with respect to the total weight of the polymerizable composition and preferably from 3 to 20 parts by weight with respect to the total weight of the polyisocyanate(s) (A) to catalyst(s) (D).

In some cases, the mixing is preferably effected at a temperature lower than 25 degrees C. in order to increase the pot life of the polymerizable composition.

When the solubility of the catalyst, the internal release agent, and additives in the monomer is not sufficiently high, they can be heated before being dissolved in the monomer and in the resin modifier.

The choice of the process to be used for producing the thiourethane resin and thereafter the optical article staring from the polymerizable composition according to the present invention is not subject to particular restrictions. The technique used is preferably cast polymerization. According to this technique, the polymerizable composition is injected into a closed mould consisting of two half-moulds separated by a seal. Operations such as degassing of the polymerizable composition at reduced pressure, filtration treatment under pressure or at reduced pressure, or similar operations, can be conveniently effected before injection into the mould.

The operating conditions of the polymerization vary according to the polymerizable composition, the type and amount of catalyst and also the shape of the mould.

The polymerization is generally effected at a temperature ranging from −50 to 150 degrees C., for a time ranging from 1 hour to 50 hours. The curing of the resin is preferably effected at a temperature within the range of 10 to 150 degrees C. for a time of 1 to 25 hours. The polymerization can be effected by maintaining the mould at the desired temperature or slowly bringing the mould to the desired temperature.

The optical article obtained from the polymerization of the polymerizable composition, if necessary, can be subjected to annealing. The annealing is normally carried out at temperatures ranging from 50 to 150 degrees C., preferably from 90 to 140 degrees C., even more preferably from 100 to 130 degrees C.

In order to improve the casting process, as mentioned above, various additives can be added to the polymerizable composition, according to necessity, such as chain extenders, curing agents, photostabilizers, UV absorbers, antioxidants, bluing agents, dyes soluble in the polymerizable composition, adhesion promoters.

The optical article of the present invention can be obtained in various forms, by simply changing the type of mould.

The thiourethane resin obtained from the polymerization of the polymerizable composition of the present invention can be used for various applications. Thanks to its high refractive index and transparency, this resin can be advantageously used as optical material for lenses for eye-glasses, lenses for photographic equipment and light emission diodes (LED).

The above-mentioned thiourethane resin can also be used for producing prisms, optical fibres, data-collecting substrates, filters and other manufactured products.

A further object of the present invention therefore relates to an optical article, in particular a lens for eye-glasses that can be obtained by the polymerization of the polymerizable composition described above.

An object of the present invention also relates to a method for producing an optical article comprising the following phases:

injecting a polymerizable composition according to the present invention into a mould and polymerizing it, forming an optical article;

depositing in sequence on said optical article, at least one hard coating layer and an anti-reflection coating.

The lens for eye-glasses of the present invention comprises a body made of a resin obtained from the polymerization of a polymerizable composition of the type described above. One or more coating layers can be applied, if requested, to the body composed of resin.

Various types of coating layers can be used: primer layers to facilitate the adhesion of the further coating layers to the body of the lens, hard coating layers, anti-reflection layers, anti-misting layers, anti-fouling layers and water-repellent layers.

The coating layers can be used and applied to the body of the lens individually. The coating layers can also be superimposed to form a single multi-layer coating which can be applied to one or both sides of the resin body of the lens.

When coating layers are present on both sides of the resin body of the lens, there can be the same sequence of superimposed layers on each side, or different sequences.

The coating layers can use or comprise, alone or mixed with each other, UV-absorbers for protecting the lenses or eyes from ultraviolet rays, IR-absorbers for protecting the eyes from infrared rays, light stabilizers or antioxidants for improving the light resistance of lenses, dyes or pigments for enhancing the aesthetic appearance of lenses, photochromatic pigments, levelling agents.

The primer is a layer which is normally distributed between the hard layer and the lens. The primer is a coating layer which improves the adhesion between the hard layer above the body of the lens. In some cases, the primer can also improve the impact strength of the lens.

The primer layer, which is an optional coating layer, is generally formed by depositing a composition on the body of the lens, containing a urethane-based resin, an epoxy-based resin, a polyester-based resin, a melanin-based resin, or a polyvinyl acetal as base component.

The primer layer can be used without the help of solvents. A suitable solvent can be used, however, for regulating the viscosity of the composition of the primer to be applied.

Coating methods or dry methods can be used for applying the primer layer to the body of the lens. With coating methods, the composition of the primer is applied to the body of the lens by means of the known spin coating or dip coating techniques, for example, allowing it to solidify to form the primer layer.

With dry methods, the coating layer is formed by the known Chemical Vapor Deposition (CVD) or vacuum deposition techniques.

When the optical lens comprises a primer layer, the surface of the body of the lens can be subjected to treatment, such as treatment with alkalis, plasma, or ultraviolet rays, in order to improve the adhesion of the primer layer.

The hard coat is a coating layer which provides the lens with scratch resistance, abrasion resistance, moisture resistance, hot-water resistance, heat resistance and stress deriving from adverse weather conditions.

For producing the hard coat layer, a composition comprising a mixture of a curable organo-silicon compound with fine particles of at least one oxide of an element selected from Si, Al, Sn, Sb, Ta, Ce, La, Fe, Zn, W, Zr, In, and Ti and/or fine particles of at least one oxide of at least two elements selected from those listed above, is generally used.

The hard coat composition preferably contains, in addition to the components described above, at least one of the following compounds: amines, amino acids, metal acetyl acetonate complexes, metal salts of organic acids, perchloric acid, salts of perchloric acid, metal chlorides and polyfunctional epoxy compounds. The composition used for forming the hard coat can be used without a solvent; a solvent can also be used, however, provided it does not influence the characteristics of the optical lens.

The hard coat is normally applied by distributing the composition on the lens, or on the underlying coating layer previously applied, with methods known in the art, such as spin coating and dip coating. Once it has been applied, the composition is cured obtaining hardening and the relative formation of the hard coating layer. The curing can be effected by heating or by irradiation with actinic radiations (for example, UV radiations and Vis).

The refractive index of the hard coat layer for inhibiting the generation of interference fringes preferably differs from that of the resin body of the lens by a maximum of plus or minus 0.1.

The lens according to the present invention can also comprise an anti-reflection layer. When present, the anti-reflection layer is applied by superimposing it over the hard layer. Compounds which can be used for this purpose are of the organic and inorganic type. In the case of organic compounds, the layers are formed by means of the known vacuum deposition, sputtering, ion plating, ion beam assisted deposition or CVD techniques, using inorganic oxides such as $SiO_2$, $TiO_2$.

In the case of organic compounds, the coating layers are deposited by means of wet techniques, using a composition containing an organo-silicon compound and silica-based fine particles having an internal cavity.

The anti-reflection coating can be a monolayer or multilayer. In the case of a monolayer, it is preferable for its refractive index to be lower than the refractive index of the hard coat layer by at least 0.1 or more. In order to obtain a more effective anti-reflection function, the lens is preferably coated with a multilayered coating. In this case, layers with a low refractive index and a high refractive index are alternately superimposed, to form the multilayered coating. Also in this case, it is preferable for the difference between the refractive index of the layer having a low index and the refractive index of the layer having a high index to be 0.1 or more. Examples of high-refractive-index layers include layers of ZnO, $TiO_2$, $CeO_2$, $Sb_2O_5$, $SnO_2$, $ZrO_2$, $Ta_2O_5$. An example of a low-refractive-index layer is a layer of $SiO_2$.

An anti-misting layer, anti-fouling layer, or water-repellent layer can be added, if necessary, to the anti-reflection layer. For the formation of the anti-misting, anti-fouling or water-repellent layers, there are no particular restrictions with respect to the treatment methods and materials to be used, provided they do not have any adverse effect on the anti-reflection properties of the lens. For this purpose, the methods and materials known in the state of the art can therefore be used.

Examples of methods which can be used for forming anti-misting and anti-fouling layers comprise coating the surface with a layer of surfactant, the addition of a layer consisting of hydrophilic material to the surface of the lens to make it water-absorbent or coating the surface with small rough areas to increase the water absorption. For the same purpose, photocatalysis techniques can also be used for obtaining water absorption or an ultra-water-repellence treatment can be effected for preventing adherence of water droplets.

Further examples of water-repellence treatment include the vapour deposition or sputtering of a silane compound also containing fluorine to form a water-repellent layer, the formation of a water-repellent film by the application on the surface of interest of a solution comprising a silane compound containing fluorine.

Lenses for eye-glasses produced with the thiourethane resin of the present invention can be tinted with a dye to give the lens the desired aesthetic characteristics and/or photochromatic properties.

The colouring of lenses can be effected using tinting methods known in the art. The colouring is generally effected by immersing the resin body forming the lens in a dyebath consisting of a liquid in which a dye is dissolved or uniformly dispersed. If necessary, the lens can be subsequently heated to fix the dye.

There are no particular restrictions in the choice of dye to be used in the tinting. Dyes known in the state of the art in the field of the invention, can be used for this purpose. Dyes soluble in the polymerizable composition or dispersible in a solvent, are generally used. Also with respect to the solvent to be used in the tinting process, there are no particular restrictions, provided the dye selected dissolves or is uniformly dispersed in the solvent.

A surfactant can be added to the dyebath, if necessary, for dispersing the dye more effectively in the tinting liquid or a carrier for transporting the dye towards the surface of the lens. The tinting process comprises a first preparation phase of a dyebath including an aqueous solution in which the dye is dispersed and to which the possible surfactant is added, if necessary. The bath can also be obtained by dispersing or dissolving the dye and possible surfactant in a mixture of water and an organic solvent.

A second phase of the tinting process comprises the immersion of the lens in the dyebath at a predetermined temperature and for a predetermined period of time. The dyeing temperature and time (residence time in the bath) vary depending on the desired colour density, from a few minutes to several tens of hours. The temperature of the bath is kept at 120 degrees C. or lower. The concentration of the dye in the dyebath ranges from 0.01 to 10% by weight. Furthermore, in order to increase the colouring efficacy, the tinting process can be carried out under pressure.

When necessary, the tinting phase of the lens is followed by an annealing phase. For this purpose, the tinted lenses are subjected to heating. The water and/or solvent of the dyebath possibly remaining on the surface of the tinted lens are removed by heating. Alternatively, the solvent is left to evaporate in the air. The heating is effected in an oven, for example an infrared-ray oven, in an atmosphere of air or in a resistance oven.

The tinting and subsequent annealing process allows the humidity which has penetrated the body of the lens during the tinting to be removed, and also prevents decolouring of the tinted lenses.

EXAMPLES

Hereinafter, the present invention will be described in more detail with reference to specific embodiment examples. The invention, however, should not be considered as being limited to these examples.

In the characterization tests of the resin according to the present invention, the refractive index, Abbe number, density, releasability, and tintability were evaluated. In particular, the above parameters were measured as follows:

refractive index ($n_e$) and Abbe number (Abbe value e line): measured at 20 degrees C. using a Pulfrich refractometer.

density measured according to Archimedes' principle.

Izod impact strength test carried out in accordance with ASTM D-256 with the difference that the test-sample was notchless.

Rockwell hardness determined according to ASTM D-785.

tintability: a dye dispersion was prepared by adding to 2.986 g of pure water, 1.0 g of "FSP Red E-A" (produced by Futaba Industrial Co., Ltd.), 1.0 g of "FSP Yellow P-E" (produced by Futaba Industrial Co., Ltd.), 2.0 g of "FSP Blue AUL-S" (produced by Futaba Industrial Co., Ltd.), 4.0 g of "Nicca Sun Salt #7000" (produced by Nicca Chemical Co., Ltd.), and 4.0 g of "DK-CN" (produced by Daiwa Chemical Industries Co., Ltd.). A platelet of resin having a thickness of 9 mm was immersed in this dye dispersion, heated to 90 degrees C., for 5 minutes. The tintability degree was evaluated by measuring the transmittance (% T) of the above resin platelet at a wavelength of 452 nm, after tinting.

Example 1

50.8 g of 2,5(6)-bis(isocyanatemethyl)bicyclo-[2.2.1]heptane were poured into a 300 ml conical beaker; 0.035 g of dimethyl tin dichloride were then added as catalyst, 0.10 g of Zelec UN (ester of a phosphate acid, produced by Stepan Co., Ltd.,) as releasing agent, and 1.50 g of Viosorb 583 as UV-ray absorber were then added and subjected to mixing at room temperature for 10 minutes or slightly longer, obtaining a homogenous solution. 25.7 g of 4-mercaptomethyl-1,8-dimercapto-3,6-dithiaoctane and 23.5 g of ethylene glycol bis(3-mercaptopropionate) were subsequently added, followed by mixing, obtaining a homogenous solution. The mixture was stirred at 20 degrees C. or lower, and degassed under a vacuum of 400 Pa or less for 30 minutes or more. The mixture was filtered through a 1-micrometer Teflon filter and then injected into a glass mould—consisting of two half-moulds kept closed by means of a washer—heated to a temperature ranging from 20 to 120 degrees C. The polymerization reaction was left to proceed for 20 hours. After cooling, a colourless, transparent resin platelet was obtained, which was easily released from the mould. The optical properties of the resin obtained were as follows: $n_e$=1.5972, Abbe value e line=39.2, specific density=1.30. The Izod impact strength was extremely high, equal to 112 KJ/$m^2$, and the Rockwell hardness was sufficient, as it proved to be 105 M, i.e. a value equal to or higher than 100 M. As a result of the tinting test, the % T measurement at 452 nm showed a good tintability, as the % T was equal to 24.0%. The results are shown in Table 1.

Example 2

46.2 g of 2,5(6)-bis(isocyanatemethyl)-bicyclo-2.2.1]heptane and 4.2 g of hexamethylene diisocyanate were poured into a 300 ml conical beaker; 0.035 g of dimethyl tin dichloride, 0.10 g of Zelec UN, and 1.50 g of Viosorb 583 were then added and subjected to mixing at room temperature for 10 minutes or slightly longer, obtaining a homogenous solution. 25.9 g of 4-mercaptomethyl-1,8-dimercapto-3,6-dithiaoctane and 23.7 g of ethylene glycol bis(3-mercaptopropionate) were subsequently added, followed by mixing, obtaining a homogenous solution. The mixture was stirred at 20 degrees C. or lower and degassed under a vacuum of 400 Pa or less for 30 minutes or more. The mixture was filtered through a 1-micrometer Teflon filter and then injected into a mould as in Example 1. The polymerization reaction was carried out under the same conditions as Example 1. After cooling, a colourless transparent resin platelet was obtained, which was easily released from the mould.

The optical properties of the resin obtained were as follows: $n_e$=1.5965, Abbe value e line=39.6, specific density=1.30. The Izod impact strength was equal to 112 KJ/m$^2$ and the Rockwell hardness was 111 M. As a result of the tinting test, the % T measurement at 452 nm showed good tintability, as the % T was equal to 11.0%. The results are shown in Table 1.

Example 3

58.7 g of bis(4-isocyanatecyclohexyl)methane were poured into a 300 ml conical beaker; 0.088 g of dimethyl tin dichloride, 0.10 g of Zelec UN, and 1.50 g of Viosorb 583 were then added and subjected to mixing at room temperature, for 10 minutes or slightly longer, obtaining a homogenous solution. 37.2 g of 4-mercaptomethyl-1,8-dimercapto-3,6-dithiaoctane and 4.1 g of ethylene glycol bis(3-mercaptopropionate) were subsequently added, followed by mixing, obtaining a homogenous solution. The mixture was stirred at 20 degrees C. or lower, and degassed under a vacuum of 400 Pa or less for 30 minutes or more. The mixture was filtered through a 1-micrometer Teflon filter and then injected into a mould as in Example 1. The polymerization reaction was carried out under the same conditions as Example 1. After cooling, a colourless transparent resin platelet was obtained, which was easily released from the mould.

The optical properties of the resin obtained were as follows: $n_e$=1.5969, Abbe value e line=39.2, specific density=1.23. The Izod impact strength was equal to 114 KJ/m$^2$, and the Rockwell hardness was 114 M. As a result of the tinting test, the % T measurement at 452 nm showed good tintability, as the % T was equal to 29.6%. The results are shown in Table 1.

Example 4

47.3 g of bis(4-isocyanatecyclohexyl)methane and 9.7 g of hexamethylene diisocyanate were poured into a 300 ml conical beaker; 0.088 g of dimethyl tin dichloride, 0.10 g of Zelec UN, and 1.50 g of Viosorb 583 were then added and subjected to mixing at room temperature, for 10 minutes or slightly longer, obtaining a homogenous solution. 36.6 g of 4-mercaptomethyl-1,8-dimercapto-3,6-dithiaoctane and 6.4 g of ethylene glycol bis(3-mercaptopropionate) were subsequently added, followed by mixing, obtaining a homogenous solution. The mixture was stirred at 20 degrees C. or lower, and degassed under a vacuum of 400 Pa or less for 30 minutes or more. The mixture was filtered through a 1-micrometer Teflon filter and then injected into a mould as in Example 1. The polymerization reaction was carried out under the same conditions as Example 1. After cooling, a colourless transparent resin platelet was obtained, which was easily released from the mould.

The optical properties of the resin obtained were as follows: $n_e$=1.5966, Abbe value e line=39.2, specific density=1.24. The Izod impact strength was equal to 107 KJ/m$^2$, and the Rockwell hardness was 102 M. As a result of the tinting test, the % T measurement at 452 nm showed good tintability, as the % T was equal to 27.7%. The results are shown in Table 1.

Example 5

46.1 g of bis(4-isocyanatecyclohexyl)methane and 11.5 g of 2,5(6)-bis(isocyanatomethyl)-bicyclo[2.2.1]heptane were poured into a 300 ml conical beaker; 0.088 g of dimethyl tin dichloride, 0.10 g of Zelec UN, and 1.50 g of Viosorb 583 were then added and subjected to mixing at room temperature, for 10 minutes or slightly longer, obtaining a homogenous solution. 36.0 g of 4-mercaptomethyl-1,8-dimercapto-3,6-dithiaoctane and 6.4 g of ethylene glycol bis(3-mercaptopropionate) were subsequently added, followed by mixing, obtaining a homogenous solution. The mixture was stirred at 20 degrees C. or lower, and degassed under a vacuum of 400 Pa or less for 30 minutes or more. The mixture was filtered through a 1-micrometer Teflon filter and then injected into a mould as in Example 1. The polymerization reaction was carried out under the same conditions as Example 1. After cooling, a colourless transparent resin platelet was obtained, which was easily released from the mould. The optical properties of the resin obtained were as follows: $n_e$=1.5979, Abbe value e line=39.2, specific density=1.24. The Izod impact strength was equal to 128 KJ/m$^2$ and the Rockwell hardness was 110 M. As a result of the tinting test, the % T measurement at 452 nm showed good tintability, as the % T was equal to 33.5%. The results are shown in Table 1.

Example 6

45.7 g of bis(4-isocyanatocyclohexyl)methane and 11.4 g of 2,5(6)-bis(isocyanatomethyl)-bicyclo[2.2.1]heptane were poured into a 300 ml conical beaker, 0.088 g of dimethyl tin dichloride, 0.10 g of Zelec UN and 1.50 g of Viosorb 583 were then added and subjected to mixing at room temperature for 10 minutes or longer, obtaining a homogenous solution. Then, 35.8 g of 4-mercaptomethyl-1,8-dimercapto-3,6-dithiaoctane and 7.1 g of bis(3-mercaptopropionate)1,4-butanediol were subsequently added, followed by mixing, obtaining a homogenous solution. The mixture was stirred at 20 degrees C. or lower, and degassed under a vacuum of 400 Pa or less for 30 minutes or more. The mixture was filtered through a 1 μm Teflon filter and then injected into a mould consisting of a glass mould and a tape, and heated to a temperature ranging from 20 to 120 degrees C. The polymerization reaction was left to proceed for 20 hours. After cooling, a colorless, transparent resin platelet was obtained, which was released from the mould.

The optical properties of the resin obtained were as follows: $n_e$=1.5971, Abbe value e line=39.2 and specific density=1.24.

Example 7

Example Using Trioctylmethylammonium Chloride (TOMAC)

49.5 g of bis(4-isocyanatocyclohexyl)methane and 8.7 g of 2,5(6)-bis(isocyanatomethyl)-bicyclo[2.2.1]heptane were poured into a 300 ml conical beaker, 2.5 g of trioctylmethylammonium chloride, 0.10 g of Zelec UN and 1.50 g of Viosorb 583 were then added and subjected to mixing at 40 degrees C. for 10 minutes or longer, obtaining a homogenous solution. After cooling to room temperature, 37.6 g of 4-mercaptomethyl-1,8-dimercapto-3,6-dithiaoctane and 4.2 g of ethylene glycol bis(3-mercaptopropionate) were subsequently added, followed by mixing, obtaining a homogenous solution. The mixture was stirred at 20 degrees C. or lower, and degassed under a vacuum of 400 Pa or less for 30 minutes or more. The mixture was filtered through a 1 μm Teflon filter and then injected into a mould consisting of a glass mould and a tape, and heated to a temperature ranging from 20 to 120 degrees C. The polymerization reaction was left to proceed for 20 hours. After cooling, a colorless, transparent resin platelet was obtained, which was released from the mould. The optical properties of the resin obtained were as follows: $n_e$=1.598, Abbe value e line=39.3 and specific density=1.23.

Comparative Example 1

50.6 g of 2,5(6)-bis(isocyanatemethyl)-bicyclo[2.2.1]heptane were poured into a 300 ml conical beaker; 0.035 g of dimethyl tin dichloride, 0.10 g of Zelec UN, and 1.50 g of Viosorb 583 were then added and subjected to mixing at room temperature, for 10 minutes or slightly longer, obtaining a homogenous solution. 25.5 g of 4-mercaptomethyl-1,8-dimercapto-3,6-dithiaoctane and 23.9 g of pentaerythritol tetrakis(3-mercaptopropionate) were subsequently added, followed by mixing, obtaining a homogenous solution. The mixture was stirred at 20 degrees C. or lower, and degassed under a vacuum of 400 Pa or less for 30 minutes or more. The mixture was filtered through a 1-micrometer Teflon filter and then injected into a mould as in Example 1. The polymerization reaction was carried out under the same conditions as Example 1. After cooling, a colourless transparent resin platelet was obtained, which was released from the mould.

The optical properties of the resin obtained were as follows: $n_e$=1.5980, Abbe value e line=39.2, and specific density=1.30. The Izod impact strength was equal to 92 KJ/m², and the Rockwell hardness was 114 M. As a result of the tinting test, the % T measurement at 452 nm did not show a particularly good tintability, as the % T was equal to 44.2%. The results are shown in Table 1.

Comparative Example 2

60.1 g of bis(4-isocyanatecyclohexyl)methane were poured into a 300 ml conical beaker; 0.035 g of dimethyl tin dichloride, 0.10 g of Zelec UN, and 1.50 g of Viosorb 583 were then added and subjected to mixing at room temperature, for 10 minutes or slightly longer, obtaining a homogenous solution. 30.9 g of 4-mercaptomethyl-1,8-dimercapto-3,6-dithiaoctane were subsequently added, followed by mixing, obtaining a homogenous solution. The mixture was stirred at 20 degrees C. or lower, and degassed under a vacuum of 400 Pa or less for 30 minutes or more. The mixture was filtered through a 1-micrometer Teflon filter and then injected into a mould consisting of a mould as in Example 1. The polymerization reaction was carried out under the same conditions as Example 1. After cooling, a colourless transparent resin platelet was obtained, which was detached from the mould.

The optical properties of the resin obtained were as follows: $n_e$=1.5996, Abbe value e line=39.1, and specific density=1.23. The Izod impact strength was equal to 88 KJ/m², and the Rockwell hardness was 114 M. As a result of the tinting test, the % T measurement at 452 nm did not show a particularly good tintability, as the % T was equal to 50.8%. The results are shown in Table 1.

TABLE 1

|  | Ex. 1 | Ex. 2 | Ex. 3 | Ex. 4 | Ex. 5 | Comp. Ex. 1 | Comp. Ex. 2 |
| --- | --- | --- | --- | --- | --- | --- | --- |
| Refractive index (ne20) | 1.5972 | 1.5965 | 1.5969 | 1.5966 | 1.5979 | 1.598 | 1.5996 |
| Abbe number | 39.2 | 39.6 | 39.2 | 39.2 | 39.2 | 39.2 | 39.1 |
| Density | 1.3 | 1.3 | 1.23 | 1.24 | 1.24 | 1.3 | 1.23 |
| Izod impact strength (KJ/m²) | 112 | 112 | 114 | 107 | 128 | 92 | 88 |
| Rockwell hardness (M) | 105 | 111 | 114 | 102 | 110 | 114 | 114 |
| Tintability (% T at 452 nm) | 24 | 11 | 29.6 | 27.7 | 33.5 | 44.2 | 50.8 |

The results of the table show that with the polymerizable composition of the present invention, optical articles are obtained with a high refractive index, a sufficient hardness, good impact strength and a good tintability. In particular, with the same hardness, the lenses obtained with the composition of the present invention have a higher impact strength and a higher tintability with respect to the polymerizable compositions of the comparative examples.

The present application claims priority based on Italian Patent Application No. MI2011A002102 filed on Nov. 18, 2011, the entire contents of which are incorporated herein by reference.

That is, the present application includes the following aspects of the invention.

a. A polymerizable composition comprising polyisocyanate(s) (A), polythiol(s) (B), thiol(s) (C) and catalyst(s) (D), wherein the polyisocyanate(s) (A) is at least one bifunctional or higher functional alicyclic polyisocyanate compound, the polythiol(s) (B) is at least a compound selected from polythiols represented by the following general formula:

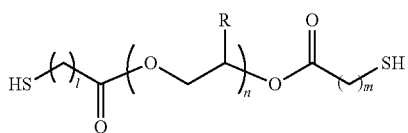

wherein l and m, the same or different from each other, represent an integer from 1 to 4; n represents an integer from 1 to 3; and R represents hydrogen or a methyl group and, when n is different from 1, the R groups are the same as or different from each other, the thiol(s) (C) is at least one compound selected from thiols having general formula (3)

(3)

wherein R1, R2, R3, the same or different from each other, are selected from —(CH$_2$)$_n$—SH, —S—(CH$_2$)$_n$—SH and —R—S—(CH$_2$)$_n$—SH, wherein R is an alkylene group having from 1 to 10 carbon atoms, n is an integer ranging from 1 to 3, said compound having general formula (3) containing at least two SH groups and at least a —S— bridge and the catalyst(s) (D) is at least a polymerization catalyst selected from metal compounds, quaternary ammonium salts, organic sulfonic acids, tertiary amines and their inorganic or organic salts, provided that if the catalyst is a tertiary amine, the polymerizable composition does not comprise monoacid diester phosphates in a molar ratio tertiary amine/diester monoacid phosphates within the range of 1/1.3 to 1/20.

b. The polymerizable composition according to a, further comprising at least one compound selected from the thiols having general formula (B2)

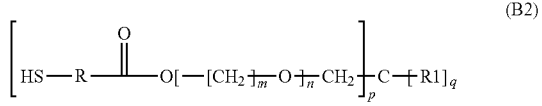

(B2)

wherein R represents alkylene groups, the same or different from each other, having from 1 to 6 carbon atoms; R1 represents alkyl groups, the same or different from each other, having from 1 to 10 carbon atoms; n is an integer ranging from 1 to 6; m is an integer ranging from 1 to 6; p is an integer ranging from 1 to 4; q is equal to 0 or 1 and p+q is equal to 4.

c. The polymerizable composition according to a or b, wherein the polyisocyanate(s) (A) is selected from 1,3-bis (isocyanatemethyl)cyclohexane, 1,4-bis(iso-cyanatemethyl) cyclohexane, bis(4-isocyanatecyclo-hexyl)methane, and bis (isocyanatemethyl)-bicyclo-[2.2.1]heptane.

d. The polymerizable composition according to any of a to c, wherein the polyisocyanate(s) (A) is a combination of at least two compounds selected from bis(4-isocyanatecyclohexyl)methane, bis(isocyanate-methyl)-bicyclo[2.2.1] heptane, 1,3-bis(isocyanatemethyl)-cyclohexane, and 1,4-bis(isocyanatemethyl)cyclohexane.

e. The polymerizable composition according to any of a to d, wherein in polythiols (B1), 1 and m, the same or different, represent an integer ranging from 1 to 2 and n is 1.

f. The polymerizable composition according to any of a to e, also comprising a polyisocyanate (E) selected from a non-cyclic aliphatic polyisocyanate, an aromatic polyisocyanate, an aliphatic polyisocyanate containing sulfur atoms, an aromatic polyisocyanate containing sulfur atoms, preferably a non-cyclic aliphatic polyisocyanate.

g. The polymerizable composition according to a to f, wherein the polyisocyanate (E) is selected from m-xylene diisocyanate, 2,4-tolylene diisocyanate, 2,6-tolylene diisocyanate, 4,4'-diphenylmethane diisocyanate, pentamethylene diisocyanate, hexamethylene diisocyanate, heptamethylene diisocyanate, octamethylene diisocyanate or mixtures thereof, more preferably from pentamethylene diisocyanate, hexamethylene diisocyanate, heptamethylene diisocyanate, or octamethylene diisocyanate.

h. The polymerizable composition according to any of a to g, wherein the thiol(s) (C) is selected from 4-mercaptomethyl-1,8-dimercapto-3,6-dithiaoctane, 4,8-, 4,7-, or 5,7-dimercaptomethyl-1,1'-dimercapto-3,6,9-tri-thiaundecane, and 2,5-bis(mercaptomethyl)-1,4-dithiane.

i. The polymerizable composition according to any of a to h, wherein the molar ratio between the mercapto groups belonging to the polythiols (B1), the thiol(s) (C) and possibly the thiols (B2) with respect to the isocyanate groups of the polyisocyanate(s) (A) varies within the range of 0.8-1.2, preferably within the range of 0.85-1.15, even more preferably within the range of 0.9-1.1.

j. The polymerizable composition according to any of a to i, wherein the catalyst comprises a tertiary amine having general formula (4)

(4)

wherein $R_1$, $R_2$, $R_3$, the same or different, are selected from a linear or branched aliphatic group containing from 1 to 20 carbon atoms, or an alicyclic group containing from 3 to 20 carbon atoms, said groups possibly containing heteroatoms such as N, O, P, S or halogen.

k. The polymerizable composition according to any of a to j, also comprising an internal releasing agent consisting of a diester monoacid phosphate represented by the following general formula (5):

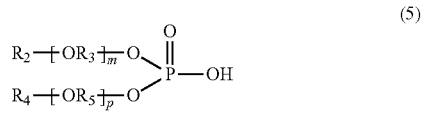

(5)

wherein $R_2$ and $R_4$, the same or different, represent a linear or branched aliphatic group containing from 1 to 20 carbon atoms, or a cyclo-aliphatic group containing from 3 to 20 carbon atoms; $R_3$ and $R_5$, the same or different, represent an alkylene group containing from 1 to 3 carbon atoms and m and p, independently from each other, are 0, 1 or 2.

l. An optical article obtainable through the polymerization of the polymerizable composition according to any of a to k.

m. An optical lens, in particular for eye-glasses, comprising an optical article according to 1, and further comprising a hard coat layer and an anti-reflective layer.

n. A method for manufacturing an optical article comprising the following phases:

injecting a polymerizable composition according to any of a to k into a mould and let it polymerize, forming an optical article;

depositing sequentially a hard coating layer and an anti-reflection layer in sequence on said optical article.

The invention claimed is:

1. A polymerizable composition comprising polyisocyanate(s) (A), polythiol(s) (B), thiol(s) (C) and catalyst(s) (D),
   wherein the polyisocyanate(s) (A) is at least one selected from 1,3-bis(isocyanatemethyl)cyclohexane, 1,4-bis(isocyanatemethyl)cyclohexane, bis(4-isocyanatecyclohexyl)methane, and bis(isocyanatemethyl)-bicyclo[2.2.1]heptane,
   the polythiol(s) (B) is at least one selected from ethylene glycol bis(3-mercaptopropionate) and 1,4-butanediol bis(3-mercaptopropionate), the thiol(s) (C) is at least one selected from 4-mercaptomethyl-1,8-dimercapto-3,6-dithiaoctane, and 4,8-, 4,7-, or 5,7-dimercaptomethyl-1,11-dimercapto-3,6,9-tri-thiaundecane, and
   the catalyst(s) (D) is at least one polymerization catalyst selected from metal compounds, quaternary ammonium salts, and organic sulfonic acids.

2. The polymerizable composition according to claim 1, further comprising at least one compound selected from the thiols having general formula (B2)

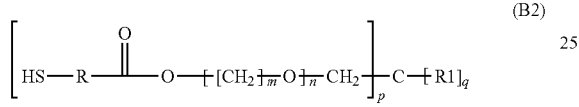

wherein R represents alkylene groups, the same or different from each other, having from 1 to 6 carbon atoms; R1 represents alkyl groups, the same or different from each other, having from 1 to 10 carbon atoms; n is an integer ranging from 1 to 6; m is an integer ranging from 1 to 6; p is an integer ranging from 1 to 4; q is equal to 0 or 1 and p+q is equal to 4.

3. The polymerizable composition according to claim 1, wherein the polyisocyanate(s) (A) is a combination of at least two compounds selected from bis(4-isocyanatecyclohexyl)methane, bis(isocyanate-methyl)-bicyclo[2.2.1]heptane, 1,3-bis(isocyanatemethyl)-cyclohexane, and 1,4-bis(isocyanatemethyl)cyclohexane.

4. The polymerizable composition according to claim 1, further comprising a polyisocyanate (E) selected from a non-cyclic aliphatic polyisocyanate, an aromatic polyisocyanate, an aliphatic polyisocyanate containing sulfur atoms, and an aromatic polyisocyanate containing sulfur atoms.

5. The polymerizable composition according to claim 4, wherein the polyisocyanate (E) is selected from m-xylene diisocyanate, 2,4-tolylene diisocyanate, 2,6-tolylene diisocyanate, 4,4'-diphenylmethane diisocyanate, pentamethylene diisocyanate, hexamethylene diisocyanate, heptamethylene diisocyanate, octamethylene diisocyanate or mixtures thereof.

6. The polymerizable composition according to claim 2, wherein the molar ratio between the mercapto groups belonging to the polythiols (B), the thiol(s) (C) and the thiols (B2) with respect to the isocyanate groups of the polyisocyanate(s) (A) varies within the range of 0.8-1.2.

7. The polymerizable composition according to claim 1, further comprising an internal releasing agent consisting of a diester monoacid phosphate represented by the following general formula (5):

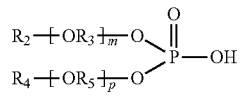

wherein $R_2$ and $R_4$, the same or different, represent a linear or branched aliphatic group containing from 1 to 20 carbon atoms, or a cyclo-aliphatic group containing from 3 to 20 carbon atoms; $R_3$ and $R_5$, the same or different, represent an alkylene group containing from 1 to 3 carbon atoms and m and p, independently from each other, are 0, 1 or 2.

8. An optical article obtained through the polymerization of the polymerizable composition according to claim 1.

9. An optical lens, in particular for eye-glasses, comprising the optical article according to claim 8, a hard coat layer and an anti-reflective layer.

10. A method for manufacturing an optical article comprising the following phases:
    injecting a polymerizable composition according to claim 1 into a mould and let it polymerize, forming an optical article;
    depositing sequentially a hard coating layer and an anti-reflection layer in sequence on said optical article.

* * * * *